United States Patent
Kim et al.

(10) Patent No.: US 11,660,710 B2
(45) Date of Patent: May 30, 2023

(54) PRESSURIZATION JIG FOR PRESSURIZING BUSBAR AND BATTERY MODULE MANUFACTURING SYSTEM COMPRISING SAME

(71) Applicant: LG CHEM, LTD., Seoul (KR)

(72) Inventors: Kyung-Mo Kim, Daejeon (KR);
Jeong-O Mun, Daejeon (KR);
Jin-Yong Park, Daejeon (KR);
Jung-Hoon Lee, Daejeon (KR);
Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 315 days.

(21) Appl. No.: 16/766,934

(22) PCT Filed: Feb. 20, 2019

(86) PCT No.: PCT/KR2019/002076
§ 371 (c)(1),
(2) Date: May 26, 2020

(87) PCT Pub. No.: WO2019/194416
PCT Pub. Date: Oct. 10, 2019

(65) Prior Publication Data
US 2020/0368855 A1   Nov. 26, 2020

(30) Foreign Application Priority Data

Apr. 4, 2018   (KR) ........................ 10-2018-0039231

(51) Int. Cl.
*B23K 37/00*   (2006.01)
*B23K 37/04*   (2006.01)
(Continued)

(52) U.S. Cl.
CPC ....... *B23K 37/0443* (2013.01); *H01M 50/211* (2021.01); *H01M 50/50* (2021.01)

(58) Field of Classification Search
CPC ................ B23K 37/0443; B23K 31/02; B23K 2101/36; B23K 2101/38;
(Continued)

(56) References Cited

U.S. PATENT DOCUMENTS

| 1,752,143 A | * | 3/1930 | Bishman | ............. | H01M 50/256 |
| | | | | | 294/166 |
| 2,003,629 A | * | 6/1935 | Coffey | ................ | H01M 50/543 |
| | | | | | 15/236.05 |

(Continued)

FOREIGN PATENT DOCUMENTS

| CN | 201632992 U | * | 11/2010 | ........... | B25B 27/205 |
| CN | 201838740 U | * | 5/2011 | | |

(Continued)

OTHER PUBLICATIONS

International Search Report (PCT/ISA/210) issued in PCT/KR2019/002076 dated May 27, 2019.

(Continued)

*Primary Examiner* — Kiley S Stoner
(74) *Attorney, Agent, or Firm* — Birch, Stewart, Kolasch & Birch, LLP (57) ABSTRACT

Disclosed is a pressing jig for welding an electrode lead located in a lead slit formed at the bus bar to the bus bar in a closely adhered state. The pressing jig includes a first frame having a first distance adjusting unit and a first pressing unit, and a second frame having a second distance adjusting unit facing the first distance adjusting unit and a second pressing unit facing the first pressing unit. The first frame and the second frame are coupled so that a distance between first pressing unit and the second pressing unit is (Continued)

increased when a distance between the first distance adjusting unit and the second distance adjusting unit is decreased, and the distance between first pressing unit and the second pressing unit is decreased when the distance between the first distance adjusting unit and the second distance adjusting unit is increased.

5 Claims, 6 Drawing Sheets

(51) Int. Cl.
*H01M 50/211* (2021.01)
*H01M 50/50* (2021.01)

(58) Field of Classification Search
CPC ...... B23K 37/04–0452; H01M 50/531; H01M 10/0404; H01M 10/0413; H01M 10/0481; H01M 50/211; H01M 50/50; H01M 50/536; H01M 50/502; B25B 5/062; Y02E 60/10
USPC ............ 228/212–213, 44.3, 44.7, 47.1, 49.1, 49.4, 228/49.5
See application file for complete search history.

(56) References Cited

U.S. PATENT DOCUMENTS

| | | | | |
|---|---|---|---|---|
| 2,419,270 | A * | 4/1947 | Linnartz | B25B 5/109 269/254 R |
| 2,737,917 | A * | 3/1956 | Steele | B23K 37/0426 254/248 |
| 2,969,448 | A * | 1/1961 | Alexander | C23C 14/26 392/389 |
| 3,874,443 | A * | 4/1975 | Bayer, Jr. | H05K 13/0491 269/254 R |
| 3,948,551 | A * | 4/1976 | Reist | B65H 29/003 294/99.1 |
| 4,034,202 | A * | 7/1977 | Vandermark | B23K 3/025 228/19 |
| 4,281,568 | A * | 8/1981 | Martinmaas | B25B 13/22 81/142 |
| 4,777,779 | A * | 10/1988 | Lodge | B65B 61/22 53/115 |
| 5,046,958 | A * | 9/1991 | Brown | H01R 4/64 219/136 |
| 5,501,239 | A * | 3/1996 | Walker | A41G 5/0073 132/275 |
| 6,308,597 | B1 * | 10/2001 | Stahle | B25B 7/16 81/424 |
| 7,549,569 | B2 * | 6/2009 | Kwan | H01L 24/78 228/904 |
| 9,136,521 | B2 | 9/2015 | Lee et al. | |
| 2004/0148746 | A1 * | 8/2004 | Nakamoto | B25B 7/18 29/227 |
| 2004/0232203 | A1 * | 11/2004 | Gaunekar | B25B 5/06 228/180.5 |
| 2014/0112744 | A1 * | 4/2014 | Bauch | B23K 37/0443 414/226.02 |
| 2014/0305913 | A1 | 10/2014 | Artelsmair et al. | |
| 2016/0120079 | A1 * | 4/2016 | Endress | B65G 17/323 198/803.7 |
| 2017/0317376 | A1 | 11/2017 | Yoon | |
| 2017/0365894 | A1 | 12/2017 | Kwon | |
| 2018/0169790 | A1 | 6/2018 | Jin et al. | |
| 2018/0194235 | A1 | 7/2018 | Kim et al. | |
| 2020/0290162 | A1 * | 9/2020 | Kim | H01M 50/505 |
| 2022/0131229 | A1 * | 4/2022 | Chi | H01M 50/296 |

FOREIGN PATENT DOCUMENTS

| | | | | |
|---|---|---|---|---|
| CN | 202129733 | U * | 2/2012 | |
| CN | 103930703 | A * | 7/2014 | ............ B25B 27/10 |
| CN | 204524653 | U | 8/2015 | |
| CN | 107175595 | A * | 9/2017 | ............ B08B 13/00 |
| CN | 107848071 | A | 3/2018 | |
| CN | 113370090 | A * | 9/2021 | |
| DE | 4026771 | A1 | 2/1992 | |
| GB | 2520704 | A * | 6/2015 | .......... B25B 27/205 |
| JP | 52-109124 | A | 9/1977 | |
| JP | 2000-67843 | A | 3/2000 | |
| JP | 2007-109548 | A | 4/2007 | |
| JP | 2008-183625 | A | 8/2008 | |
| KR | 10-1794944 | B1 | 11/1917 | |
| KR | 10-2012-0121346 | A | 11/2012 | |
| KR | 10-1298849 | B1 | 8/2013 | |
| KR | 10-1417412 | B1 | 7/2014 | |
| KR | 20-2014-0005849 | U | 11/2014 | |
| KR | 10-2015-0125387 | A | 11/2015 | |
| KR | 10-2016-0017574 | A | 2/2016 | |
| KR | 10-2016-0056207 | A | 5/2016 | |
| KR | 10-2016-0087302 | A | 7/2016 | |
| KR | 10-1693790 | B1 | 1/2017 | |
| KR | 10-2017-0103232 | A | 9/2017 | |
| KR | 10-2017-0142481 | A | 12/2017 | |
| WO | WO 2313/063628 | A1 | 5/2013 | |

OTHER PUBLICATIONS

English machine translation of JP-2000-67843-A, published on Mar. 3, 2000.
English machine translation of JP-2008-183625-A, published on Aug. 14, 2008.
Extended European Search Report for European Application No. 19781991.5 dated Mar. 1, 2021.

* cited by examiner

PRESSURIZATION JIG FOR PRESSURIZING BUSBAR AND BATTERY MODULE MANUFACTURING SYSTEM COMPRISING SAME

TECHNICAL FIELD

The present application claims priority to Korean Patent Application No. 10-2018-0039231 filed on Apr. 4, 2018 in the Republic of Korea, the disclosures of which are incorporated herein by reference.

The present disclosure relates to a pressing jig for pressing a bus bar and a battery module manufacturing system including the pressing jig, and more specifically, to a pressing jig for pressing a bus bar at both sides so that the bus bar is welded to an electrode lead in close contact with each other, and a battery module manufacturing system including the pressing jig.

BACKGROUND ART

In a conventional battery module, a bus bar is used for electrically connecting stacked battery cells to each other, and a plurality of electrode leads respectively drawn out from the plurality of battery cells are bent and positioned on the bus bar, followed by welding.

If the battery module is manufactured in this way, in a state where the bent electrode lead is positioned on the bus bar, the electrode lead is pressed toward the bus bar by using a jig so that the electrode lead is closely adhered to the bus bar, and then laser is irradiated onto the electrode lead to perform welding thereto.

Figure 1:
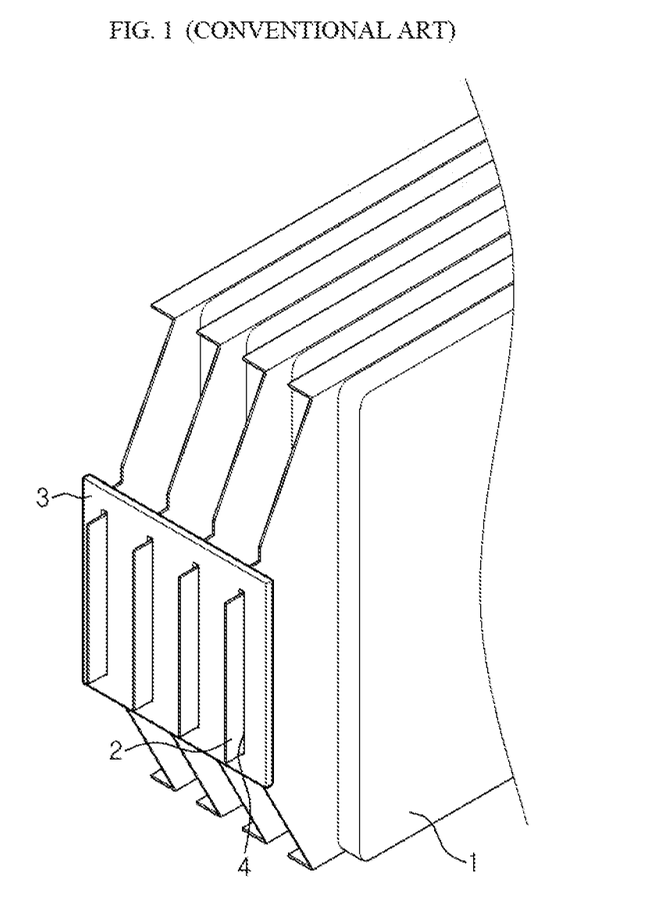
FIGS. 1 and 2 are diagrams for illustrating a process of coupling an electrode lead and a bus bar, in manufacturing a conventional battery module.
Figure 2:
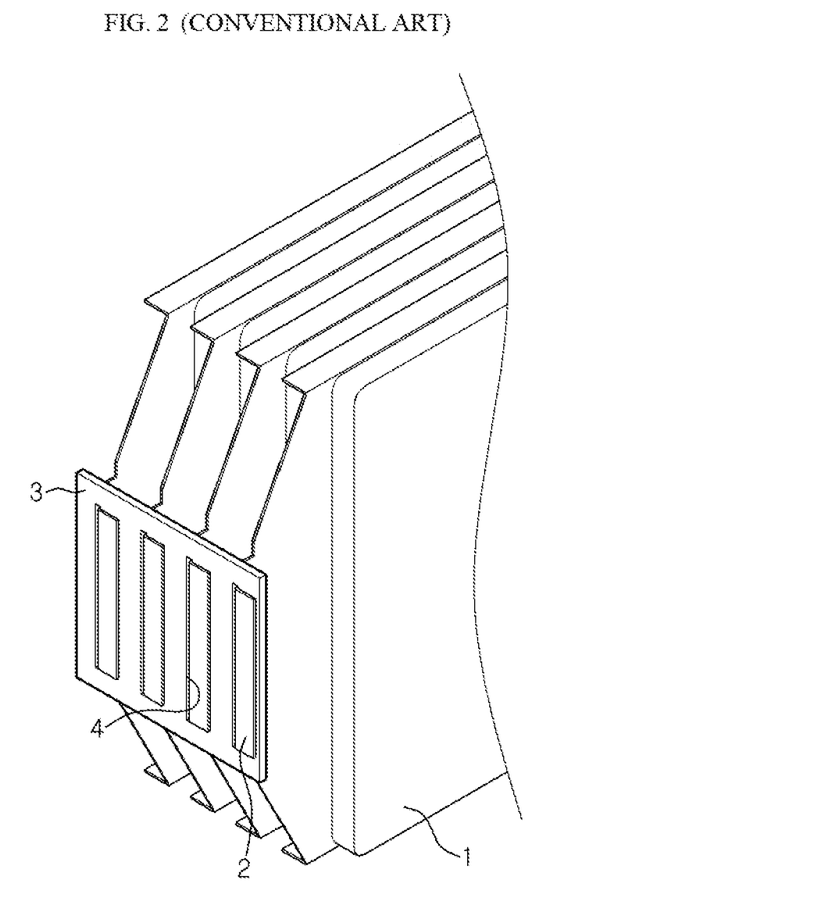

Referring to FIGS. 1 and 2, there is shown a conventional battery module in which a plurality of pouch-type battery cells are electrically connected by a bus bar.

The conventional battery module is manufactured by inserting each electrode lead 2 drawn from a plurality of pouch-type battery cells 1 into a lead slit 4 of a bus bar 3 as shown in FIG. 1, and then bending the inserted electrode lead 2 to be closely adhered to the bus bar 3 and then performing welding thereto as shown in FIG. 2.

However, in the conventional battery module as described above, in addition to the process of inserting the electrode lead 2 into the lead slit 4 of the bus bar 3 and the process of welding the electrode lead 2 to the bus bar 3, the process of bending the electrode lead 2 is additionally required, which makes the process complicated.

In addition, if the cell applied to the battery module is a pouch-type cell, as the cell has a smaller thickness, the electrode lead is also manufactured to have a shorter length. If the electrode lead is shortened as above, the bonding area between the electrode lead and the bus bar is also reduced to lower the bonding strength, thereby increasing the possibility of product failure.

Thus, it is required to develop a battery module structure in which the electrode lead bending process may be omitted, and accordingly, a new pressing jig for welding, which is suitable for the bonding structure of the electrode lead and the bus bar is also required.

DISCLOSURE

Technical Problem

The present disclosure is designed to solve the problems of the related art, and therefore the present disclosure is directed to providing a pressing jig, which may press a bus bar at both sides so that the bus bar is welded to an electrode lead in close contact with each other, in manufacturing a battery module in which the electrode lead is coupled to the bus bar by welding without being bent for the coupling with the bus bar.

Technical Solution

In one aspect of the present disclosure, there is provided a pressing jig for welding, which is installed at one side of a battery module to press a bus bar of the battery module at both sides thereof so that an electrode lead located in a lead slit formed at the bus bar is welded to the bus bar in a closely adhered state, the pressing jig comprising: a first frame having a first distance adjusting unit and a first pressing unit; and a second frame having a second distance adjusting unit facing the first distance adjusting unit and a second pressing unit facing the first pressing unit, wherein the first frame and the second frame are coupled by a hinge so that a distance between first pressing unit and the second pressing unit is increased when a distance between the first distance adjusting unit and the second distance adjusting unit is decreased, and the distance between first pressing unit and the second pressing unit is decreased when the distance between the first distance adjusting unit and the second distance adjusting unit is increased.

The pressing jig may further comprise a hinge configured to connect the first frame and the second frame so that the first frame and the second frame pivot relative to each other.

The pressing jig may further comprise a restoring member connected between the first distance adjusting unit and the second distance adjusting unit to apply an elastic force to the first distance adjusting unit and the second distance adjusting unit toward each other.

The pressing jig may further comprise a distance adjusting knob configured to rotate based on a rotary shaft having a thread so that the first frame moves toward or away from the second frame.

The first pressing unit may have a first gripping portion formed at an end thereof; the second pressing unit may have a second gripping portion formed at an end thereof; and gripping grooves may be respectively formed at facing surfaces of the first gripping portion and the second gripping portion in a predetermined depth so that the bus bar is inserted therein.

In another aspect of the present disclosure, there is also provided a battery module manufacturing system, comprising: a battery module including a cell stack formed by stacking a plurality of battery cells, a module case accommodating the cell stack, and a bus bar assembly covering an opening formed at one side of the module case; and a pressing jig installed on the bus bar assembly to press a bus bar included in the bus bar assembly at both sides thereof so that an electrode lead located in a lead slit formed at the bus bar is welded to the bus bar in a closely adhered state.

Advantageous Effects

According to an embodiment of the present disclosure, it is possible to manufacture a battery module without performing a process of bending the electrode lead, thereby simplifying the manufacturing process of the battery module. Thus, the electrode lead of the battery cell is not exposed out of the bus bar, and thus it is possible to minimize the disconnection between the electrode lead and the bus bar due to the friction between the electrode lead and an external object during the assembly process and/or in use, thereby minimizing the occurrence of product failure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A pressing jig according to an embodiment of the present disclosure and a battery module manufacturing system including the pressing jig will be described with reference to FIGS. 3 to 6.

Figure 3:
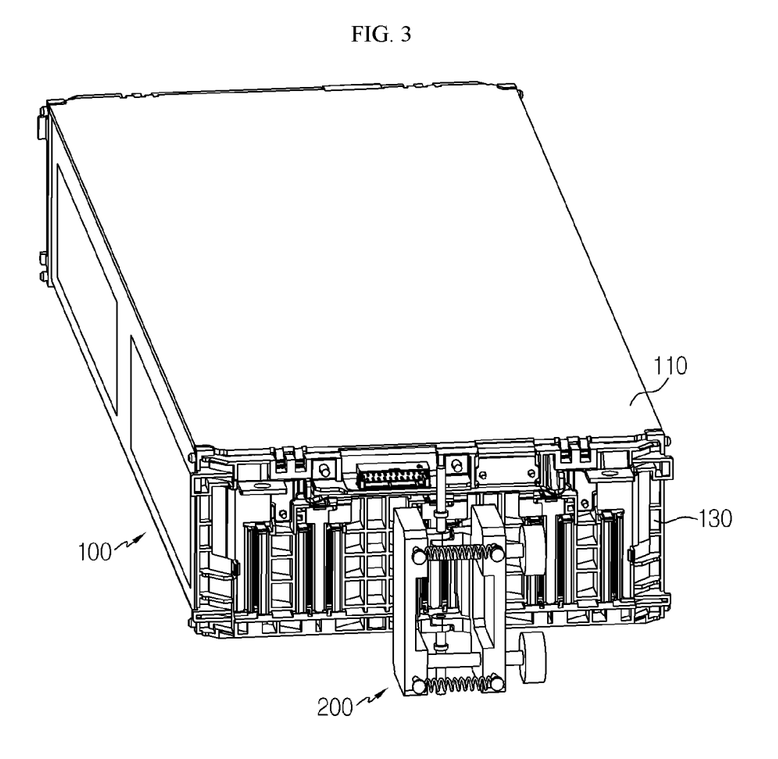
FIG. 3 is a diagram showing a pressing jig according to an embodiment of the present disclosure and a battery module manufacturing system including the pressing jig.
Figure 4:
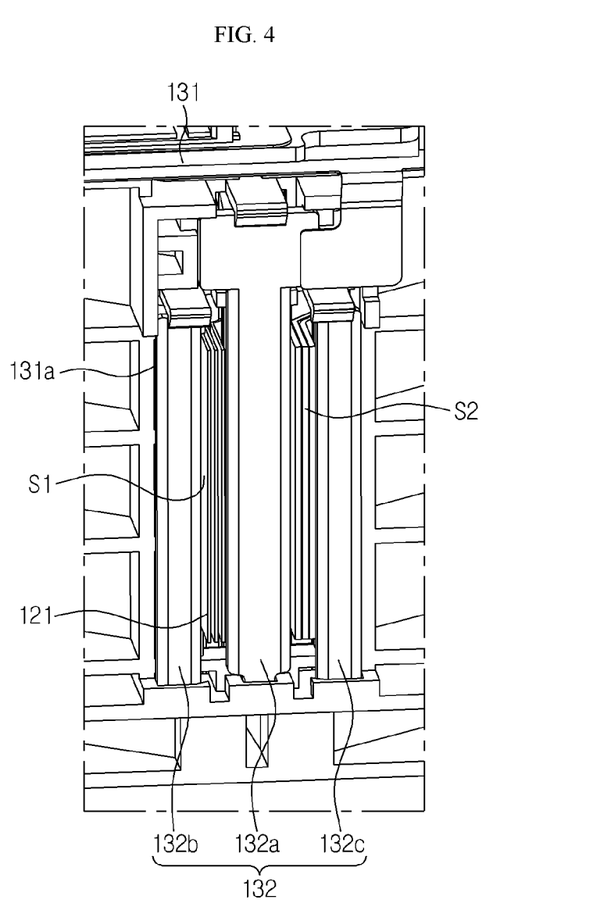
FIG. 4 is a partially enlarged view of the battery module showing that the electrode lead is exposed through a lead slit formed at the bus bar.

FIG. 3 is a diagram showing a pressing jig according to an embodiment of the present disclosure and a battery module manufacturing system including the pressing jig, and FIG. 4 is a partially enlarged view of the battery module showing that the electrode lead is exposed through a lead slit formed at the bus bar. Also, FIG. 5 is a diagram showing that the bus bar is pressed using the pressing jig according to an embodiment of the present disclosure, and FIG. 6 is a perspective view showing the pressing jig according to an embodiment of the present disclosure.

Figure 5:
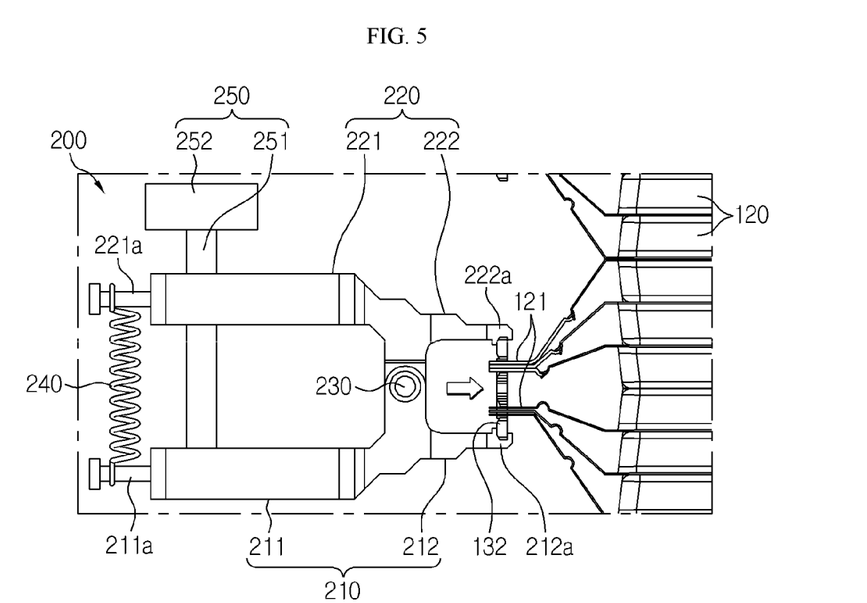
FIG. 5 is a diagram showing that the bus bar is pressed using the pressing jig according to an embodiment of the present disclosure.
Figure 6:
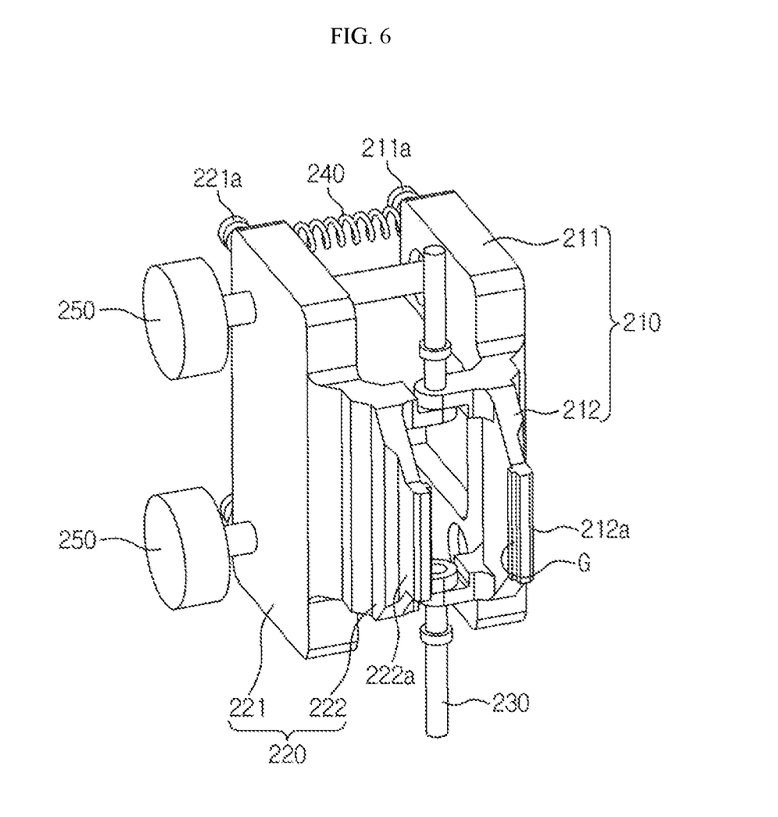
FIG. 6 is a perspective view showing the pressing jig according to an embodiment of the present disclosure.

First, referring to FIGS. 3 to 5, the battery module manufacturing system according to an embodiment of the present disclosure is implemented to include a battery module 100 and a pressing jig 200 installed at one side thereof.

The battery module 100 is configured by accommodating a cell stack (see FIG. 5) formed by stacking a plurality of battery cells 120 in a module case 110 and then closing an opening at one side of the module case 110 by using a bus bar assembly 130.

The battery cells 120 have a pair of electrode leads 121 drawn out in opposite directions. Two or more electrode leads 121 drawn from the plurality of battery cells 120 adjacent to each other and extending in the same direction are gathered to form one electrode lead assembly, which is inserted into lead slits S1, S2 formed at a bus bar 132, explained later.

The bus bar assembly 130 includes a bus bar frame 131 sized and shaped corresponding to the opening formed at one side of the module case 110 so that the cell stack may be inserted therein, and a plurality of bus bars 132 fixedly mounted to the bus bar frame 131.

The plurality of bus bars 132 are respectively installed at a plurality of bus bar accommodation portions 131a provided at the bus bar frame 131 with a size and shape corresponding to the bus bar 132.

The bus bar 132 includes a first bus bar 132a located at the center and a second bus bar 132b and a third bus bar 132c located at both sides of the first bus bar 132a. The second bus bar 132b and the third bus bar 132c are configured as components separate from the bus bar 132a.

The first bus bar 132a is installed to be fixed in the bus bar accommodation portion 131a of the bus bar frame 131. The second bus bar 132b and the third bus bar 132c are disposed at both sides of the first bus bar 132a inside the bus bar accommodation portion 131a and are installed to move toward or away from the bus bar 132a.

The second bus bar 132b and the third bus bar 132c are gripped by gripping portions 212a, 222a of the pressing jig 200 inserted into the bus bar accommodation portion 131a and move toward the first bus bar 132a so that the electrode leads 121 respectively located in the first lead slit S1 formed between the first bus bar 132a and the second bus bar 132b and the second lead slit S2 formed between the first bus bar 132a and the third bus bar 132c are pressed.

The first electrode lead assembly drawn from the first battery cell group including the plurality of stacked battery cells 120 and the second electrode lead assembly drawn from the second battery cell group adjacent to the first battery cell group are in contact with the same bus bar 132, thereby electrically connecting a pair of battery cell groups adjacent to each other.

At this time, the first electrode lead assembly and the second electrode lead assembly have different polarities, and thus the first battery cell group and the second battery cell group adjacent to each other are connected in series.

That is, the battery module 100 is configured so that the plurality of battery cells 120 of the first battery cell group are connected to each other in parallel, and the plurality of battery cell groups are connected to each other in series.

Even though the figures depict only a case where one battery cell group includes three battery cells 120 and thus one electrode lead assembly is formed by gathering three electrode leads, the present disclosure is not limited thereto.

That is, one battery cell group may include two battery cells 120 or four or more battery cells 120, and thus one electrode lead assembly may also include two electrode leads 121 or four or more electrode leads 121.

Next, the detailed configuration of the pressing jig 200 according to an embodiment of the present disclosure will be described with reference to FIGS. 5 and 6.

FIG. 5 is a diagram showing that the bus bar is pressed using the pressing jig according to an embodiment of the present disclosure, and FIG. 6 is a perspective view showing the pressing jig according to an embodiment of the present disclosure.

Referring to FIGS. 5 and 6, the pressing jig 200 according to an embodiment of the present disclosure may include a first frame 210, a second frame 220, a hinge 230, a restoring member 240, and a distance adjusting knob 250.

The first frame 210 includes a first distance adjusting unit 211 and a first pressing unit 212, and the second frame 220 includes a second distance adjusting unit 221 and a second pressing unit 222. The first frame 210 and the second frame 220 are coupled by the hinge 230 so that they may pivot relative to each other.

In the present disclosure, based on a portion of the first frame 210 coupled to the second frame 220 by the hinge 230, a portion located at one side is defined as a first distance adjusting unit 211, and a portion located at the other side opposite to the above side is defined as a first pressing unit 212. Similarly, in the second frame 220, a portion located at one side based on a portion coupled to the first frame 210 by the hinge 230 is defined as a second distance adjusting unit 221, and a portion located at the other side opposite to the above side is defined as a second pressing unit 222.

In a state where the first frame 210 and the second frame 220 are coupled to each other by the hinge 230, the first distance adjusting unit 211 and the second distance adjusting unit 221 are disposed to face each other, and the first pressing unit 212 and the second pressing unit 222 are disposed to face each other.

The first frame 210 and the second frame 220 are coupled by the hinge 230 such that, if the distance between the first distance adjusting unit 211 and the second distance adjusting unit 221 is decreased, the distance between the first pressing unit 212 and the second pressing unit 222 is increased, and if the distance between the first distance adjusting unit 211 and the second distance adjusting unit 221 is increased, the distance between the first pressing unit 212 and the second pressing unit 222 is decreased.

That is, when using the pressing jig 200, the user may manipulate the pressing jig 200 so that the distance between the first distance adjusting unit 211 and the second distance adjusting unit 221 is increased, thereby pressing the bus bar 132 at both sides. Meanwhile, the first pressing unit 212 includes a first gripping portion 212a formed at one end thereof so that the bus bar 132 is stably gripped. The first gripping portion 212a has is a gripping groove G formed in a predetermined depth at a portion in contact with the bus bar 132.

Similarly, the second pressing unit 222 includes a second gripping portion 222a formed at one end thereof so that the bus bar 132 is stably gripped. The second gripping portion 222a has a gripping groove G formed in a predetermined depth at a portion in contact with the bus bar 132.

That is, each of the first gripping portion 212a and the second gripping portion 222a have the gripping grooves G formed at the facing surfaces thereof, thereby allowing the second bus bar 132b and the third bus bar 132c being partially inserted and fixed in a stable way.

Referring to FIGS. 5 and 6 along with FIG. 4, the first gripping portion 212a and the second gripping portion 222a are inserted between an inner wall of the bus bar accommodating portion 131a and the second bus bar 132b and between an inner wall of the bus bar accommodating portion 131a and the third bus bar 132c, respectively, to move the second bus bar 132b and the third bus bar 132c toward the first bus bar 132a.

In addition, since the second bus bar 132b and the third bus bar 132c are moved as above, the first lead slit S1 and the second lead slit S2 become narrower. As a result, the electrode lead assembly inserted in the first lead slit S1 and the electrode lead assembly inserted in the second lead slit S2 are pressed to closely adhere the electrode lead 121 and the bus bar 132 to each other.

The restoring member 240 is a member having an elastic restoring force and connected between the first frame 210 and the second frame 220. Specifically, both ends of the restoring member 240 are coupled to a first fixing portion 211a extended from one end of the first distance adjusting unit 211 and a second fixing portion 221a extending from one end of the second distance adjusting unit 221, respectively, and the restoring member 240 applies a force to the first distance adjusting unit 211 and the second distance adjusting unit 221 such that the first distance adjusting unit 211 and the second distance adjusting unit 221 move close to each other.

That is, if no other external force is applied to the first distance adjusting unit 211 and the second distance adjusting unit 221, the first distance adjusting unit 211 and the second distance adjusting unit 221 are moved toward each other due to the restoring member 240, and thus, the first pressing unit 212 and the second pressing unit 222 are moved away from each other.

The distance adjusting knob 250 may be implemented to include a rotary shaft 251 having a thread formed on at least a portion of an outer circumferential surface thereof and a knob handle 252 connected to one end of the rotary shaft 251.

The other end of the rotary shaft 251, which is opposite to the one end where the knob handle 252 is formed, is pivotally coupled to the first distance adjusting unit 211, and the rotary shaft 251 is provided through the second distance adjusting unit 221. A thread corresponding to the thread formed on the rotary shaft 251 is formed on an inner surface of a perforation hole of the second distance adjusting unit 221 through which the rotary shaft 251 is provided. By doing so, as the rotary shaft 251 rotates, the second distance adjusting unit 221 moves toward or away from the first distance adjusting unit 211.

That is, if the adjusting knob 250 is rotated along a clockwise direction, the second distance adjusting unit 221 moves away from the first distance adjusting unit 211, and thus the distance between the first pressing unit 212 and the second pressing unit 222 is decreased to press the bus bar 132. On the contrary, if the adjusting knob 250 is rotated along a counterclockwise direction, the second distance adjusting unit 221 moves toward the first distance adjusting unit 211, and thus the distance between the first pressing unit 212 and the second pressing unit 222 is increased, thereby releasing the pressing to the bus bar 132.

Thus, the user of the pressing jig 200 may rotate the distance adjusting knob 250 in the clockwise direction in a state where the first pressing unit 212 and the second pressing unit 222 are separated wider than the width of the bus bar 132, so that the second bus bar 132b and the third bus bar 132c are moved toward the first bus bar 132a, and then perform welding in a state where the electrode leads 121 located in the lead slits S1, S2 are closely adhered to the bus bar 132.

In this case, a welding device may access the bus bar 132 along the direction indicated by an arrow in FIG. 5 through the space between the first frame 210 and the second frame 220.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A pressing jig for welding, which is installed at one side of a battery module to press a bus bar of the battery module at both sides thereof so that an electrode lead located in a lead slit formed at the bus bar is able to be welded to the bus bar in a closely adhered state, the pressing jig comprising:
   a first frame having a first distance adjusting unit and a first pressing unit;
   a second frame having a second distance adjusting unit facing the first distance adjusting unit and a second pressing unit facing the first pressing unit;
   a hinge configured to couple the first frame and the second frame;
   a first fixing portion extending from one end of the first distance adjusting unit in a direction away from the hinge, and a second fixing portion extending from one end of the second distance adjusting unit in the direction away from the hinge,
   a restoring member connected between the first fixing portion of the first distance adjusting unit and the second fixing portion of the second distance adjusting unit; and
   a distance adjusting knob adjusting a distance between the first distance adjusting unit and the second distance adjusting unit,
   wherein the first frame and the second frame are coupled by the hinge so that a distance between first pressing unit and the second pressing unit is increased when a distance between the first distance adjusting unit and the second distance adjusting unit is decreased, and the distance between the first pressing unit and the second pressing unit is decreased when the distance between the first distance adjusting unit and the second distance adjusting unit is increased, and
   wherein the hinge, the restoring member and the distance adjusting knob are separated from each other so that the distance adjusting knob is located between the hinge and the restoring member.

2. The pressing jig according to claim 1, wherein the hinge is configured to couple the first frame and the second frame so that the first frame and the second frame pivot relative to each other.

3. The pressing jig according to claim 1, wherein the restoring member is connected between the first distance adjusting unit and the second distance adjusting unit to apply an elastic force to the first distance adjusting unit and the second distance adjusting unit toward each other.

4. The pressing jig according to claim 1, wherein the distance adjusting knob is configured to rotate based on a rotary shaft having a thread so that the first frame moves toward or away from the second frame.

5. The pressing jig according to claim 1,
   wherein the first pressing unit has a first gripping portion formed at an end thereof;
   wherein the second pressing unit has a second gripping portion formed at an end thereof; and
   wherein gripping grooves are respectively formed at facing surfaces of the first gripping portion and the second gripping portion in a predetermined depth so that the bus bar is inserted therein.

* * * * *